(12) United States Patent
Akimoto et al.

(10) Patent No.: US 6,329,973 B1
(45) Date of Patent: Dec. 11, 2001

(54) IMAGE DISPLAY DEVICE (75) Inventors: Hajime Akimoto, Oume; Mitsuru Hiraki, Kodaira; Hitoshi Nakahara, Nagoya; Takashi Akioka, Akishima; Yoshiyuki Kaneko, Hachiouji; Makoto Tsumura; Yoshiro Mikami, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/043,534

(22) PCT Filed: Sep. 20, 1995

(86) PCT No.: PCT/JP95/01886

§ 371 Date: Mar. 20, 1998

§ 102(e) Date: Mar. 20, 1998

(87) PCT Pub. No.: WO97/11447

PCT Pub. Date: Mar. 27, 1997

(51) Int. Cl.[7] .................................................. G09G 3/36
(52) U.S. Cl. ............................................... 345/98; 345/90
(58) Field of Search .................................... 345/113, 114, 345/115, 116, 121, 125, 127, 131, 133, 147, 136, 213, 90–93, 87, 98, 99, 100; 348/518, 581

(56) References Cited

U.S. PATENT DOCUMENTS

| | | | |
|---|---|---|---|
| 4,751,502 | * 6/1988 | Ishii et al. | |
| 4,774,506 | 9/1988 | Bossoutrout et al. | |
| 4,824,106 | * 4/1989 | Ueda et al. | |
| 5,289,173 | 2/1994 | Numao. | |
| 5,400,052 | * 3/1995 | Otake et al. | 345/127 |
| 5,546,104 | 8/1996 | Kuga. | |
| 5,598,565 | 1/1997 | Reinhardt. | |
| 5,757,365 | * 5/1998 | Ho | 345/212 |

FOREIGN PATENT DOCUMENTS

| | | |
|---|---|---|
| 0655725 | 5/1995 | (EP). |
| 0725380 | 8/1996 | (EP). |
| 56-91290 | 7/1981 | (JP). |
| 63-289588 | 11/1988 | (JP). |
| 63-304294 | 12/1988 | (JP). |
| 2-246481 | 10/1990 | (JP). |
| 4-134419 | 5/1992 | (JP). |
| 05-199328 | * 8/1993 | (JP). |
| 5-297841 | 11/1993 | (JP). |
| 7-123183 | 5/1995 | (JP). |

OTHER PUBLICATIONS

S. Kaneko, "Color TFT Liquid Crystal Color Display", *Journal of the Institute of Electronics, Information and Communication Engineers of Japan*, vol. 78, No. 7, pp. 662–667, Jul. 1995 (in Japanese).

Y. Inaba et al., "Ferroelectric LCD", *Journal of the Institute of Electronics, Information ofCommunication Engineers and Japan*, vol. 78, No. 7, pp. 676–679, Jul. 1995, (in Japanese).

* cited by examiner

*Primary Examiner*—Regina Liang
(74) *Attorney, Agent, or Firm*—Antonelli, Terry, Stout & Kraus, LLP (57) ABSTRACT

An image display for displaying image data on an image display part constructed by a display pixel array is disclosed. In an image display in which image data input means for inputting image data so that the display pixel array has two neighboring areas having different frame rates (>0) is provided or image data is displayed on an image display part constructed by a display pixel array, there is provided image data input means which can input at least one moving image data and at least one still image data into the image display part at different frame rates (>0). A high precision image display can be realized hardly changing a display pixel rewriting speed.

16 Claims, 7 Drawing Sheets

IMAGE DISPLAY DEVICE

BACKGROUND OF THE INVENTION

The present invention relates to an image display for displaying image data on an image display part constructed by a display pixel array.

Figure 8:
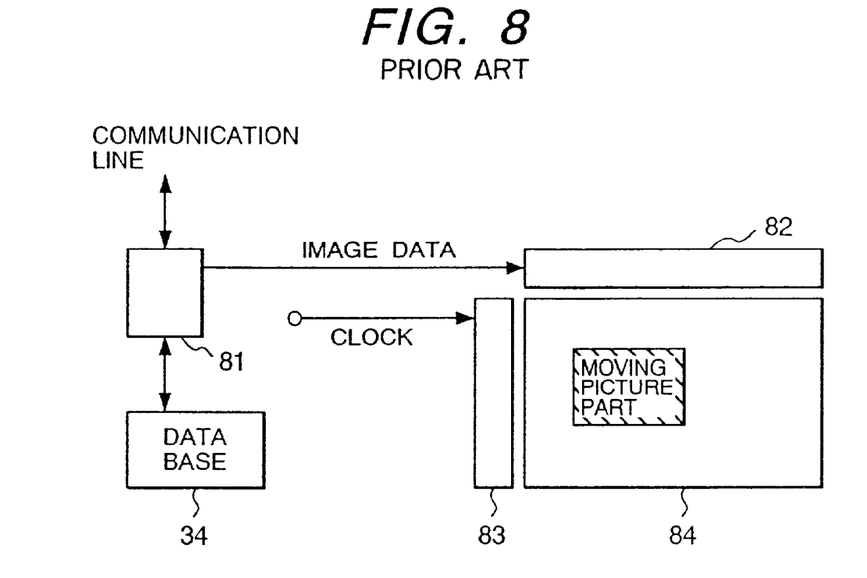
FIG. 8 is a diagram showing the construction of a first conventional technique.

Conventional techniques will be described hereinbelow with reference to FIGS. 8 and 9. FIG. 8 shows a first conventional example of an image display. A data communication line for supplying compressed image information and a CD-ROM 34 serving as a database are connected to an image data generating apparatus 81. Image data generated by the image data generating apparatus 81 is sequentially inputted to a liquid crystal driver 82 serving as an image data writing means. The liquid crystal driver 82 transfers the image data to a TFT liquid crystal panel 84 constructed by a pixel array. A shift register 83 is provided at the end of the TFT panel 84.

The operation of the first conventional technique will be described. In accordance with a request of the image data generating apparatus 81, image information compressed according to the MPEG1 standard is supplied from the communication line or the CD-ROM 34 to the image data generating apparatus 81. The image data generating apparatus 81 sequentially inputs image data of each frame to the liquid crystal driver 82. Each time the image data of pixels of one horizontal line is accumulated, the liquid crystal driver 82 inputs the image data pixels of one horizontal line in a lump to the TFT liquid crystal panel 84. The shift register 83 sequentially designates the row on the pixel array to which the image data is inputted.

The image display having such a TFT liquid crystal display is described, for example, in S. Kaneko, "Color TFT Liquid Crystal Display", *Journal of the Institute of Electronics, Information and Communication Enqineers of Japan*, Vol. 78, No. 7, pp. 662–667, July 1995 (in Japanese.).

Figure 9:
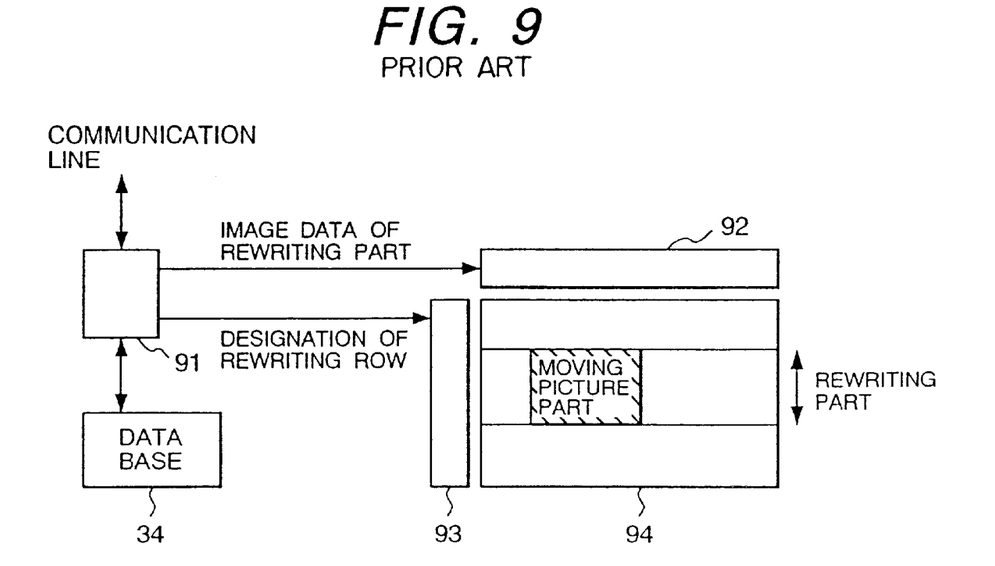
FIG. 9 is a diagram showing the construction of a second conventional technique.

FIG. 9 shows a second conventional technique of the image display. A data communication line for supplying compressed image information and the CD-ROM 34 as a database are connected to an image data generating apparatus 91. Image data generated by the image data generating apparatus 91 is inputted to a liquid crystal driver 92 as an image data writing means. The liquid crystal driver 92 transfers the image data to a ferroelectric liquid crystal panel 94 constructed by a pixel array. A decoder 93 is provided at an end of the ferroelectric liquid crystal panel 94.

The operation of the second conventional technique will be described. In accordance with a request of the image data generating apparatus 91, image information compressed according to the MPEG1 standard is supplied from the communication line or the CD-ROM 34 to the image data generating apparatus 91. The image data generating apparatus 91 inputs image data of only rows including a part (called a moving picture part) changed from the previous frame as rewriting part image data to the liquid crystal driver 92. Each time image data of (one row of) pixels of one horizontal line is accumulated, the liquid crystal driver 92 inputs the image data of pixels of one horizontal line in a lump to the ferroelectric liquid crystal panel 94. The decoder 93 designates a row on the pixel array to which the image data is inputted. With respect to a still picture part, previous rewriting image data is stored by using a memory function of the ferroelectric liquid crystal.

The image display having the ferroelectric liquid crystal display is described, for example, in Y. Inaba et al., "Ferroelectric LCD", *Journal of the Institute of Electronics, Information and Communication Engineers of Japan*, Vol. 78, No. 7, pp. 676–679, July 1995 (in Japanese).

SUMMARY OF THE INVENTION

According to the first conventional technique, all of the display pixels are rewritten every frame. Since the number of display pixels are as small as, for example, about (640×480), it is not so difficult. However, in order to realize a high picture quality image display in which the number of display pixels is (thousands×thousands), a rewriting speed of the display pixels is increased by one order of magnitude. It is therefore difficult to realize the display by using the rewriting operation of the first conventional technique.

According to the second conventional technique, the rewriting part in a frame is reduced by using the memory function of the ferroelectric liquid crystal, thereby reducing the rewriting amount per unit time. It is, however, substantially difficult for the ferroelectric liquid crystal to store data at a multivalued level and the ferroelectric liquid crystal cannot store a full color still image. In order to display the full color still image, it is therefore necessary to rewrite every frame. In a manner similar to the first conventional technique, a problem of the display pixel rewriting speed occurs also in the second conventional technique.

It is an object of the invention to provide an image display in which a problem of a rewriting speed does not occur.

The object can be achieved by an image display for displaying image data on an image display part constructed by a display pixel array, in which the display pixel array has an image data inputting means which can input image data so that the display pixel array has two neighboring areas having different frame rates (>0).

The object can be also achieved by providing image data inputting means which can input at least one moving image data and at least one still image data to an image display part at different frame rates (>0).

DETAILED DESCRIPTION OF THE PREFERRED EMBODIMENTS

First Embodiment

A first embodiment of the invention will be described hereinbelow with reference to FIGS. 1 to 4.

Figure 4:
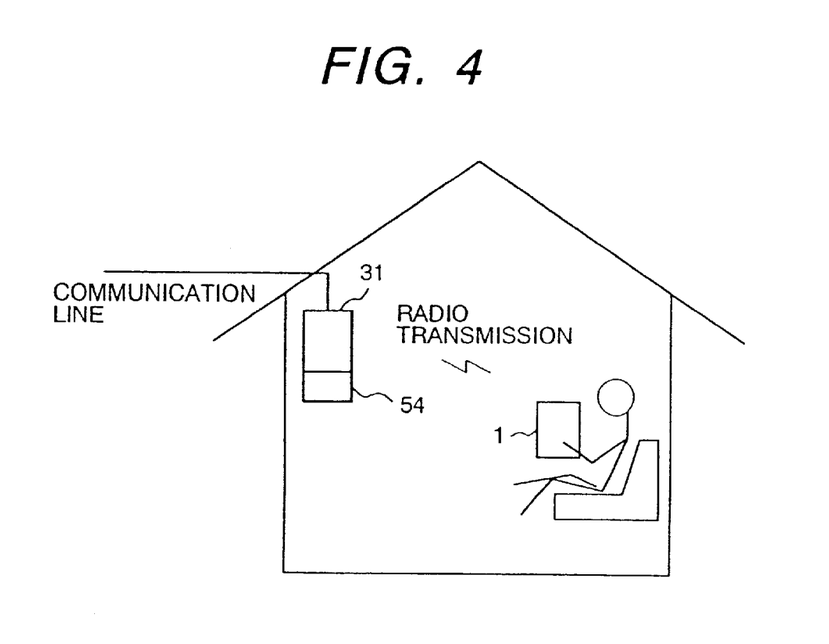
FIG. 4 is a diagram illustrating an operating state of the first embodiment.

FIG. 4 is a diagram illustrating an operating state of the embodiment. A parent device 31 of an image display according to the embodiment is fixedly arranged in a house or the like and is connected to a communication line. Image data generated by the parent device 31 is transferred to a child device 1 by microwave and is displayed on the child device 1. The user uses the child device 1 in his hands and puts it on a charger 54 connected to the parent device 31 when the child device is not used.

Figure 1:
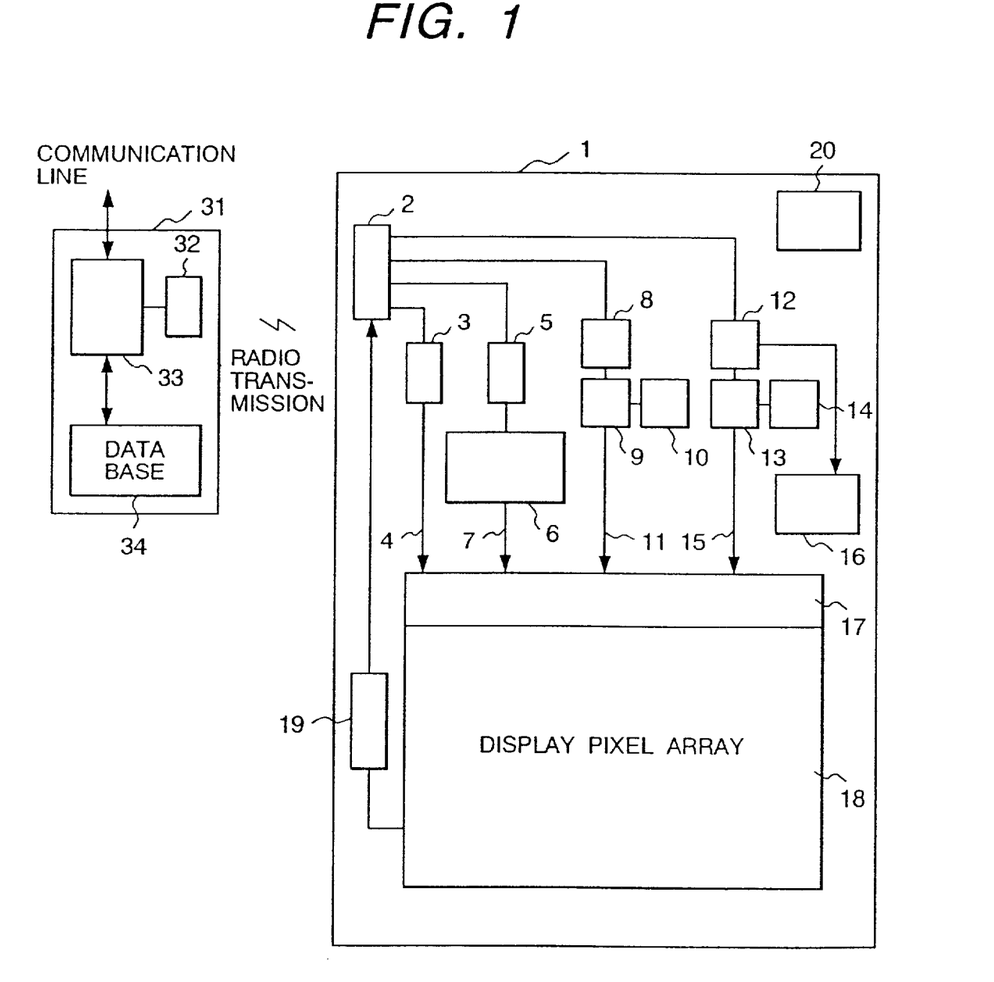
FIG. 1 is a diagram showing the construction of a first embodiment.

The construction of the embodiment will be described hereinbelow with reference to FIGS. 1 and 2. FIG. 1 is a diagram showing the construction of the embodiment. A data communication line for supplying compressed image information and a CD-ROM 34 as a database are connected to an image data generating apparatus 33. Further, a radio interface 32 for transferring generated image data by a microwave is connected to the image data generating apparatus 33. Those elements are provided for the parent device 31 of the image display. Information is transferred and received wirelessly between the radio interface 32 in the parent device 31 and a radio interface 2 in the child device 1. Four kinds of outputs are supplied from the radio interface 2. A first output is supplied to a moving image decoder 3 and to a write signal generating circuit 17 via a moving image write line 4. A second output is supplied to a still image decoder 5, a still image memory 6, and to the write signal generating circuit 17 via a still image write line 7. A third output is supplied to a text code memory 8, an outline font generating circuit 9, and to the write signal generating circuit 17 via a text write line 11. A fourth output is supplied to an icon/window address memory 12, an icon/window generating circuit 13, and to the write signal generating circuit 17 via an icon/window write line 15. An outline font ROM 10 and an icon/window ROM 14 are connected to the outline font generating circuit 9 and the icon/window generating circuit 13, respectively. An icon/window position detecting circuit 16 is also connected to the icon/window address memory 12. A timing generating circuit 20 is also provided and outputs of the position detecting circuit 16 and the timing generating circuit 20 control the still image memory 6, the text code memory 8, and the icon/window address memory 12 (the outputs are omitted here).

A display pixel array 18 for displaying an image by using a TN liquid crystal is further connected to the write signal generating circuit 17. The display pixel array 18 has a touch sensor and an output of the touch sensor is inputted to the radio interface 2 via a touch sensor output generating circuit 19.

Figure 2:
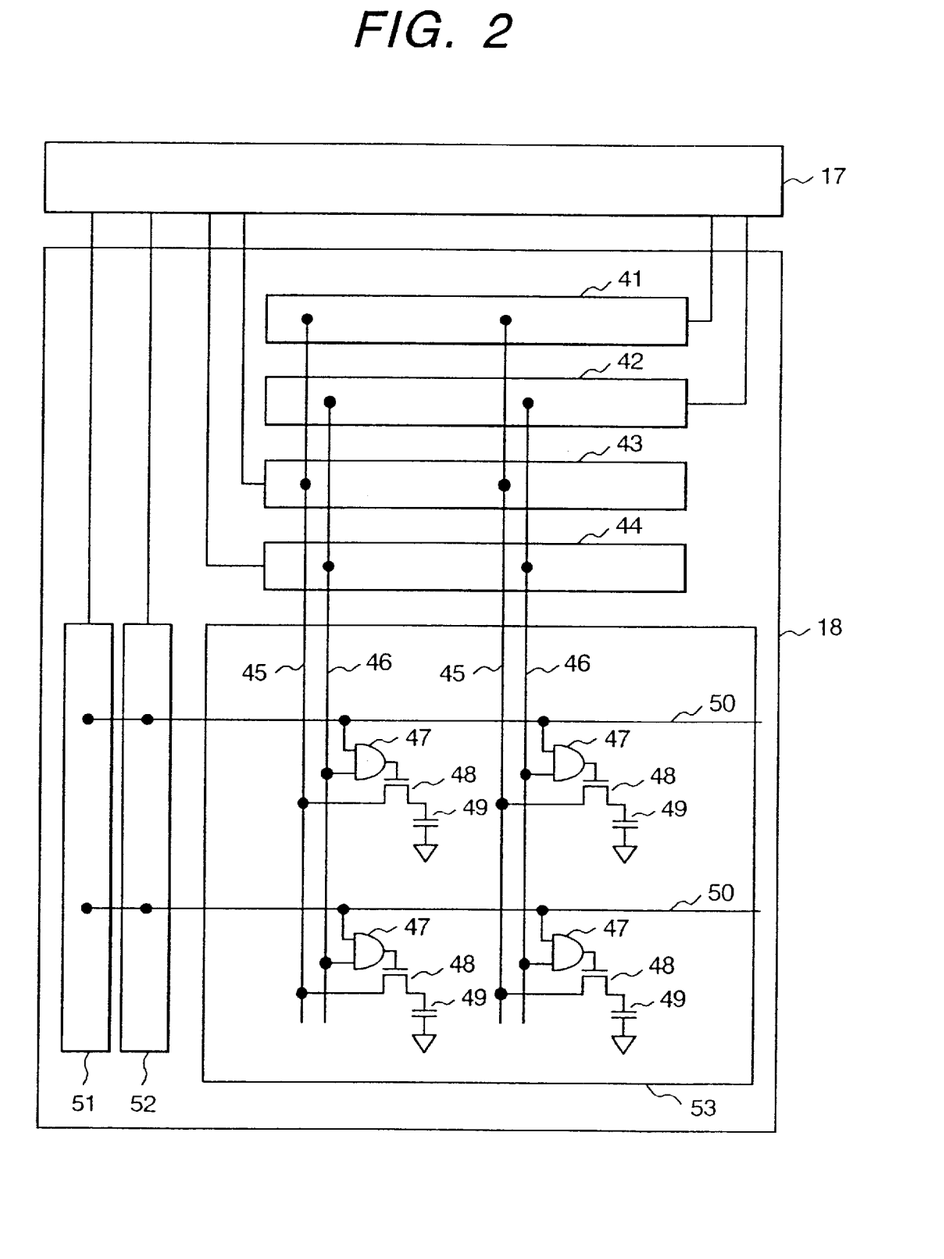
FIG. 2 is a diagram showing the internal construction of a display pixel array of the first embodiment.

FIG. 2 is a diagram showing the internal construction of the display pixel array 18. Display pixels are arranged in a matrix state in a display pixel area 53. Each pixel is constructed by a TN liquid crystal capacitor 49, a TFT switch 48 connected to the TN liquid crystal capacitor 49, and an AND gate circuit 47 for driving the gate of the TFT switch 48. The AND gate circuit 47 and the TFT switch 48 are formed by a CMOS process of a poly-Si TFT. The other terminal of the TFT switch 48 is connected to a signal line 45 and input terminals of the AND gate circuit 47 are connected to a vertical direction gate selection line 50 and a horizontal direction gate selection line 46 in the row and column directions, respectively. A moving image signal output circuit 43 and a still image signal output circuit 41 are connected to the signal line 45. A moving image vertical direction selecting circuit 52 and a still image vertical direction selecting circuit 51 are connected to the vertical direction gate selection line 50. A moving image horizontal direction selecting circuit 44 and a still image horizontal direction selecting circuit 42 are connected to the horizontal direction gate selection line 46. The moving image signal output circuit 43, the still image signal output circuit 41, the moving image vertical direction selecting circuit 52, the still image vertical direction selecting circuit 51, the moving image horizontal direction selecting circuit 44, and the still image horizontal direction selecting circuit 42 are connected to the write signal generating circuit 17.

Figure 3:
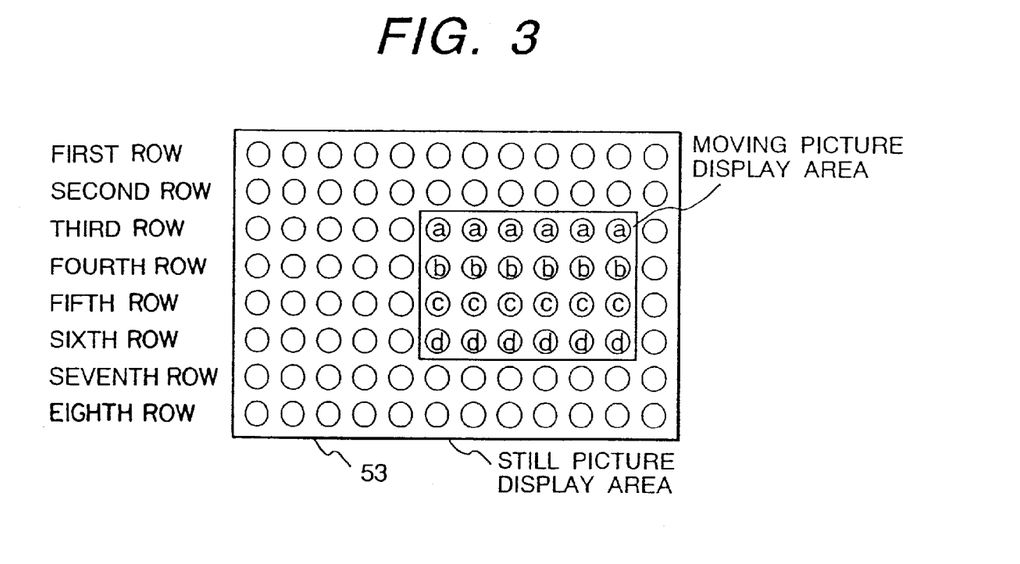
FIG. 3 is a diagram for illustrating how a moving image and a still image are written to the display pixel array of the first embodiment.

The operation of the embodiment will be described hereinbelow with reference to FIGS. 1, 2, and 3. As shown in FIG. 1, compressed image information inputted from the data communication line and the CD-ROM 34 as a database is divided by the image data generating apparatus 33 into moving image data, still image data, text data, figure information, and icon and window data, the data is subjected to a predetermined coding process, and the resultant data is inputted to the radio interface 32. The image data is inputted from the parent device radio interface 32 to the child device radio interface 2 and is inputted to predetermined signal processing systems in accordance with the kinds of the data. That is, the moving image data is converted to a video signal by the moving image decoder 3, which is supplied to the write signal generating circuit 17 via the moving image write line 4. The still image is converted to video signals by the still image decoder 5. After that, the video signal is once written in the still image memory 6. The still image data is sequentially inputted to the write signal generating circuit 17 via the still image writing line 7 at predetermined timings. The text data and the figure information are once stored in a text code form or the like in the text code memory 8. The text data and the figure information is sequentially read by the outline font generating circuit 9 at a predetermined timing and is converted into still image data. After that, the still image data is inputted to the write signal generating circuit 17 via the text writing line 11. The icon and window data is once stored in a state of a data code and image address data into the icon/window address memory 12. The icon and window data is sequentially read by the icon/window generating circuit 13 at a predetermined timing and is converted to still image data. After that, the still image data is inputted to the write signal generating circuit 17 via the icon/window writing line 15.

The reading operation of data from the still image memory 6, the text code memory 8, and the icon/window address memory 12 is controlled by the timing generating circuit 20 as will be described hereinlater. Changes in the position and shape of the icon and the window are detected by the icon/window position detecting circuit 16. When those changes are detected, the icon/window position detecting circuit 16 interrupts the inputting operation of the still image data controlled by the timing generating circuit 20 to the write signal generating circuit 17 and writes still image data to display pixel addresses of a part in which the position or shape of the icon and the window is changed.

The write signal generating circuit 17 sends a write signal to the display pixel array 18 on the basis of inputted image data, which will be described hereinlater with reference to FIG. 2. The display pixel array 18 has the touch sensor. Address information instructed by the tip of a finger or the like is inputted to the touch sensor output generating circuit 19 and to the image data generating apparatus 33 via the radio interfaces 2 and 32 and a command of the operator is transmitted.

The operation of the display pixel array 18 will be described with reference to FIG. 2.

The write signal generating circuit 17 divides the image data into a moving image and a still image and outputs data and addresses of each of the images. The data of the moving image is supplied to the moving image signal output circuit 43 and the address of the moving image is outputted to the moving image vertical direction selecting circuit 52 and the moving image horizontal direction selecting circuit 44. The data of the still image is outputted to the still image signal output circuit 41 and the address of the still image is outputted to the still image vertical direction selecting circuit 51 and the still image horizontal direction selecting circuit 42.

When an image signal is written in the display pixel, the moving image vertical direction selecting circuit 52 selects an address in the row direction and the moving image horizontal direction selecting circuit 44 selects an address of the moving image in the selected row. As a result, the AND gate circuit 47 of the selected display pixel is turned on and the connected TFT switch 48 is turned on. By A/D converting the moving image data, the moving image signal output circuit 43 generates a signal voltage to be inputted to each of the selected display pixels and applies the signal voltage to the signal line 45. The signal voltage is inputted to the TN liquid crystal capacitor 49 via the TFT switch 48. Since the signal writing method of the still image is similar to that of the moving image, its description is omitted here.

Timings of writing the moving and still images to the display pixel array 18 will be described with reference to FIG. 3. FIG. 3 illustrates how to write the moving and still images to the display pixel array 18. The display pixels are shown in circles in the display pixel area 53. For simplicity, the display pixel array has 8 rows×12 columns. Among the display pixels, those with reference characters (a) to (d) are display pixels of the moving image and the other are display pixels of the still images. When it is assumed that a leak of current from the TN liquid crystal capacitor 49 is sufficiently small and flicker is not conspicuous if a refresh writing operation is performed (m) times per second and that (n) moving images are inputted per second. When the display pixels of the still image display area has (j) rows and the display pixels of the moving display area has (k) rows, the ratio of the writing rows of the still image to the moving image per unit time is (m×j): (n×k). For example, when (m) is 10, (n) is 60, (j) is 8, and (k) is 4, the ratio is 1:3. It is understood that the writing operation in the ratio of three writing rows of the moving image to one writing row of the still image is sufficient.

With respect to other examples of numerical values, it is assumed that the display pixel array 18 displaying the still image has 5000 rows of pixels and a moving picture displayed 30 frames per second on the display pixel array 18 has 500 scan lines. In this case as well, it is assumed that the leak current from the TN liquid crystal capacitor 49 is sufficiently suppressed and the flicker is not conspicuous in a still image if the refresh writing operation is executed once per second, the ratio of the writing rows per unit time of the still image to the moving image can be set to 1:3 by the above-mentioned equation. As compared with a case where 30 frames of a moving image each having 500 scan lines are displayed per second, the speed of writing data to the display pixel array is increased only by 33% ((1+3)/3=1.33). However, a display at a present time point of a general VGA specification is performed with about 480 rows and 60 frames/second. Consequently, the writing speed of 500 rows and 30 frames/second in the embodiment which is 33% higher has an advantage that the writing speed can be reduced to about 70% of that of a general display at present (1.33×(500/480)×(30/60)=0.69).

When the refresh writing frame rate of the still image is decreased as mentioned above, a flicker occurs in an image. When the writing to the display pixel is not performed by a sequential scan but the image is divided into (g) fields and a writing scan is intermittently performed every (g) rows, the flicker is suppressed more and the writing operation at a lower frame rate can be performed.

Although the microwave is used to transfer data from the parent device 31 to the child device 1 in the foregoing embodiment, it is obviously understood that other data transfer means such as infrared light, wire, and the like can be also used.

The same unit of one display pixel is used for both of the moving image and the still image in the embodiment. However, since the precision as high as that of the still image is not generally required in the moving image, (2×2) or arbitrary (h×i) display pixels in the still image can be used as a unit of display pixels in the moving image. When signals are written to the (h×i) display pixels at the same timing, unnecessary increase in writing speed can be prevented.

An image signal accuracy of about 6 bits is requested in the moving image and that of about 8 bits is required in the still image. Consequently, when the accuracy of the A/D converter of the moving image signal output circuit 43 and that of the still image signal output circuit 41 are changed to 6 bits and 8 bits, respectively, the bit accuracy of the moving image signal output circuit 43 which is requested to operate at higher speed becomes lower, so that designing of the A/D converter is facilitated.

Although a case where one moving picture display area is surrounded by one still picture display area has been described in the embodiment, according to the idea of the invention, if the moving and still picture display areas having different frame rates exist, the effects of the invention can be obtained irrespective of the number of areas and arrangement of the areas. The effects of the invention can be also obtained when still picture display areas having different frame rates are neighboring.

Second Embodiment

Figure 5:
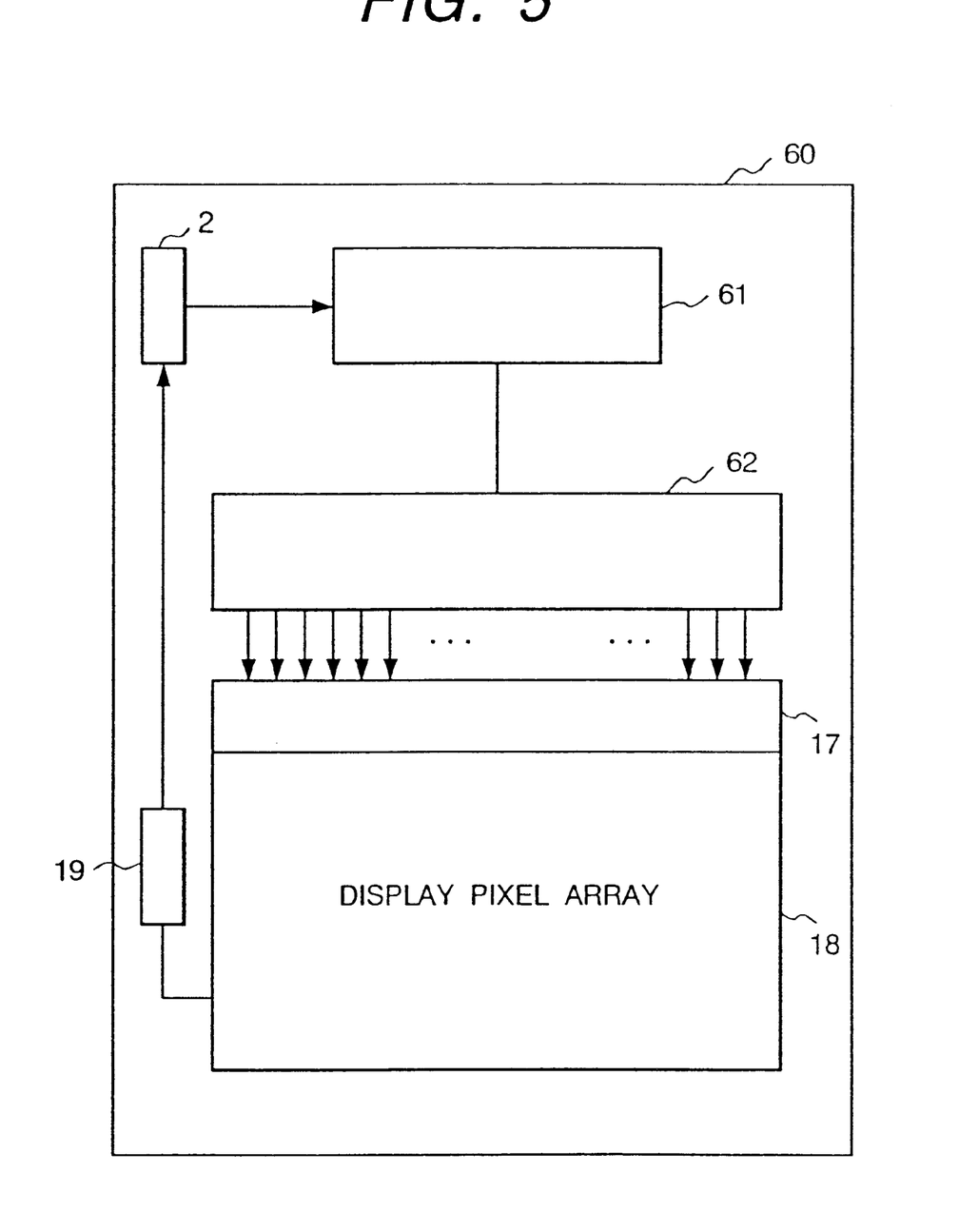
FIG. 5 is a diagram showing the construction of a child device in a second embodiment.

A second embodiment of the invention will be described hereinbelow with reference to FIG. 5. FIG. 5 is a diagram illustrating the construction of a child device 60 in the embodiment. Since the construction and operation of the parent device 31 are similar to those in the first embodiment, their description are omitted here.

The difference between the present embodiment and the first embodiment is as follows. In the first embodiment, the elements from the radio interface 2 to the signal generating circuit 17 are constructed by an electronic circuit as hardware. On the contrary, in the second embodiment, the same function is realized by software on a microcomputer 61 and an image memory 62 having parallel output ports. The second embodiment can also obtain effects similar to those of the first embodiment.

Especially, when the number of output ports of the image memory 62 is set to the same as the number of pixels in the column direction of the display pixel array part, it is convenient from the viewpoint of the layout of the signal generating circuit 17.

Third Embodiment

Figure 6:
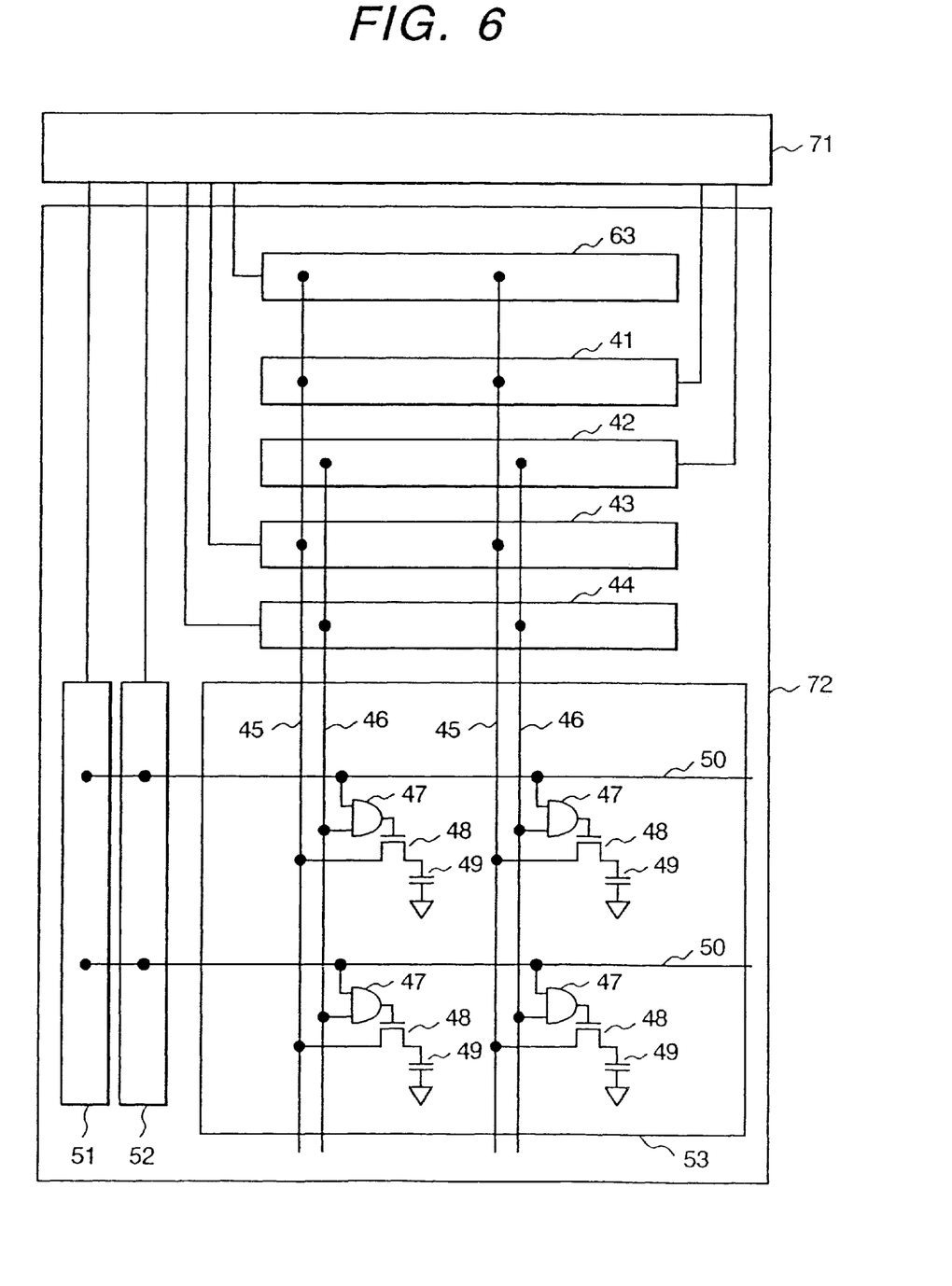
FIG. 6 is a diagram showing the construction of a write signal generating circuit and a display pixel array in a third embodiment.

A third embodiment of the invention will be described hereinbelow with reference to FIG. 6. FIG. 6 is a diagram showing the construction of a write signal generating circuit 71 and a display pixel array 72 according to the third embodiment. The difference of the third embodiment from the first embodiment is that a two-gradation still image signal output circuit 63 is provided and an output of the two-gradation still image signal output circuit 63 is used to write binary image data.

In case of using the two-gradation still image signal output circuit 63, an A/D converter is unnecessary so that power consumption is very small. For image data using monochromatic color or only multicolors of 8 colors, the power source of the still image signal output circuit 41 is temporarily stopped, thereby enabling the power consumption to be reduced.

Fourth Embodiment

Figure 7:
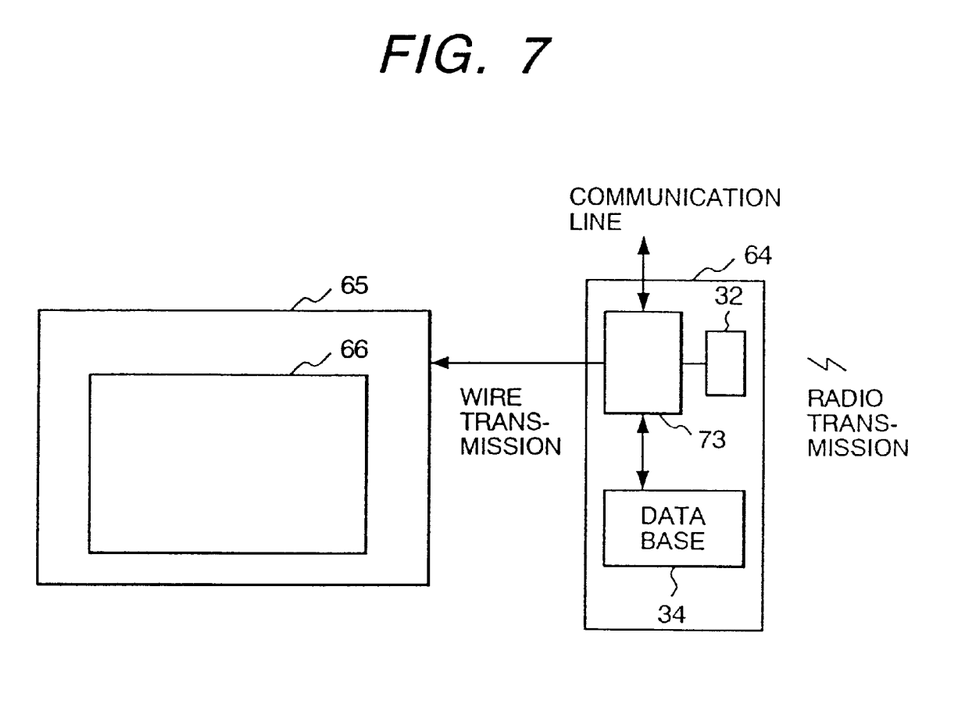
FIG. 7 is a diagram showing the construction of a parent device in a fourth embodiment.

A fourth embodiment of the invention will be described hereinbelow with reference to FIG. 7. FIG. 7 is a diagram showing the construction of a parent device 64 in the embodiment. The difference of the fourth embodiment from the first embodiment is that another child device 65 having a large screen 66 is connected to an image data generating apparatus 73 and the child device 1 (not shown) and the child device 65 commonly use the system of the parent device 64.

According to the embodiment, a plurality of child devices are controlled by the single parent device 64, thereby reducing the cost.

According to the embodiments, the image display having high picture quality of hundreds of dots/inch which is about the same as that of a printed matter and (thousands× thousands) display pixels can be realized without hardly increasing the rewriting speed of the display pixels.

What is claimed is:

1. An image display which displays image data on an image display part constructed by a display pixel array, wherein an image data input circuit inputs image data into the image display part by selecting addresses in a row direction and a column direction of the display pixel array so that the display pixel array has two neighboring areas having different frame rates (>0);

wherein the display pixel array includes row direction address lines and column direction address lines; and wherein display pixels of the display pixel array each include an AND logical circuit which is connected to one of the row direction address lines and one of the column direction address lines.

2. An image display according to claim 1, further comprising:

an image data generating circuit; and a signal transmitting circuit which wirelessly transmits image data generated by the image data generating circuit to the image data input circuit.

3. An image display according to claim 2, further comprising:

a second image display part having a smaller portability than the image display part; and a second signal transmitting circuit which transmits over a wire image data generated by the image data generating circuit to the second image display part.

4. An image display according to claim 1, further comprising a frame rate selecting circuit which selects a frame rate of the display pixel array on a display pixel unit basis.

5. An image display according to claim 1, wherein the image data input circuit inputs image data having a first gradation precision into one area of the display pixel array, and inputs image data having a second gradation precision which is different from the first gradation precision into another area of the display pixel array.

6. An image display according to claim 5, wherein the image data input circuit inputs image data having only two gradations into the one area of the display pixel array.

7. An image display according to claim 1, wherein the image data is divided into frames; and wherein the image data input circuit divides each of the frames of the image data into a first number of fields when inputting image data into one area of the display pixel array, and divides each of the frames of the image data into a second number of fields which is different from the first number of fields when inputting image data into another area of the display pixel array.

8. An image display according to claim 1, wherein when a shape or a position of an area of the display pixel array into which image data is being inputted at a first frame rate which is different from a second frame rate at which image data is being inputted into another area of the display pixel array changes, the image data input circuit preferentially inputs image data into the area of the display pixel array having the changed shape or position.

9. An image display according to claim 1, wherein the display pixel array is a liquid crystal display pixel array using a TN (Twisted Nematic) mode liquid crystal.

10. An image display which displays image data on an image display part constructed by a display pixel array, wherein an image data input circuit inputs image data into the image display part by selecting addresses in a row direction and a column direction of the display pixel array so that the display pixel array has two neighboring areas having different frame rates (>0);

wherein the image data input circuit inputs image data into the image display part by using a plurality of display pixels of one area of the display pixel array as a unit display pixel when inputting image data into the one area of the display pixel array, and by using a single display pixel of another area of the display pixel array as a unit display pixel when inputting image data into the other area of the display pixel array.

11. An image display which displays image data on an image display part constructed by a display pixel array, wherein an image data input circuit inputs at least one moving image data and at least one still image data at different frame rates (>0) into the image display part by selecting addresses in a row direction and a column direction of the display pixel array;

wherein the display pixel array includes row direction address lines and column direction address lines; and wherein display pixels of the display pixel array each include an AND logical circuit which is connected to one of the row direction address lines and one of the column direction address lines.

12. An image display according to claim 11, wherein the moving image data is inputted into the image display part in a real-time manner from generation of data.

13. An image display according to claim 11, further comprising a still image data storing circuit which temporarily stores the still image data until it is inputted into the image display part.

14. An image display according to claims 13, further comprising a code data storing circuit which temporarily stores two-gradation text and figure data in a predetermined code data format until it is inputted into the image display part.

15. An image display which displays image data on an image display part constructed by a display pixel array, wherein image data input means inputs image data into the image display part by selecting addresses in a row direction and a column direction of the display pixel array so that the display pixel array has two neighboring areas having different frame rates (>0);

wherein the display pixel array includes row direction address lines and column direction address lines; and wherein display pixel s of the display pixel array each include an AND logical circuit which is connected to one of the row direction address lines and one of the column direction address lines.

16. An image display which displays image data on an image display part constructed by a display pixel array, wherein image data input means inputs at least one moving image data and at least one still image data at different frame rates (>0) into the image display part by selecting addresses in a row direction and a column direction of the display pixel array;

wherein the display pixel array includes row direction address lines and column direction address lines; and wherein display pixels of the display pixel array each include an AND logical circuit which is connected to one of the row direction address lines and one of the column direction address lines.

* * * * *